United States Patent [19]

Pinner, Jr.

[11] 4,456,067

[45] Jun. 26, 1984

[54] PROCESS FOR INHIBITING HYDRATE FORMATION IN PRODUCING GAS WELLS

[75] Inventor: Felton R. Pinner, Jr., Houston, Tex.

[73] Assignee: Marathon Oil Company, Findlay, Ohio

[21] Appl. No.: 435,016

[22] Filed: Oct. 18, 1982

Related U.S. Application Data

[63] Continuation-in-part of Ser. No. 250,801, Apr. 3, 1981, abandoned.

[51] Int. Cl.³ .............................................. E21B 43/12
[52] U.S. Cl. ................................... 166/279; 166/362; 166/371
[58] Field of Search .................. 166/244 C, 279, 280, 166/310, 362, 371

[56] References Cited

U.S. PATENT DOCUMENTS

| | | | |
|---|---|---|---|
| 2,352,805 | 7/1944 | Scheuermann et al. | 166/310 |
| 2,748,867 | 6/1956 | Lissant | 252/8.55 R X |
| 2,790,500 | 4/1957 | Jones | 166/310 X |
| 3,021,901 | 2/1962 | Earlougher | 252/8.55 B |
| 3,131,146 | 4/1964 | Griffith | 252/8.55 R X |
| 3,348,614 | 10/1967 | Sinclair et al. | 166/310 |
| 3,577,515 | 5/1971 | Vandegaer | 424/432 |
| 3,627,047 | 12/1971 | Wilson | 166/302 |
| 3,676,363 | 7/1972 | Mosier | 252/316 |
| 3,968,840 | 7/1976 | Tate | 166/280 |

OTHER PUBLICATIONS

Uren, *Petroleum Production Engineering, Oil Field Exploitation*, 3rd Edition, McGraw-Hill Books Co., Inc., New York, 1953, pp. 600-602.

"Alcohol Prevents S. Barrow Field Freezeups", *The Oil and Gas Journal*, vol. 68, No. 52, Dec. 28, 1970, p. 174.

Withers et al., "Glycol Injection Solves Canadian Gas-Gathering Problem", *The Oil and Gas Journal*, vol. 65, No. 6, Feb. 6, 1967, pp. 81-86.

"Relationship Between Temperature of Hydrate Formation of Natural Gases and Freezing Temperatures of Antihydrate Inhibitors," A. G. Aliev et al., *Gazovaya Prom.*, May 1969-pp. 16-18-Tulsa Abstract.

"Prevention of Hydrate Formation in the Well-Bore Area," V. I. Sumets, *Gazovaya Prom.*, Feb. 1974-pp. 24-26-Tulsa Abstract.

*Primary Examiner*—George A. Suchfield
*Attorney, Agent, or Firm*—Jack L. Hummel

[57] ABSTRACT

Microcapsules containing a gas hydrate inhibitor, such as a glycol, are suspended in a carrier fluid and injected directly into a gas-bearing formation via a producing well. The microcapsules release the hydrate inhibitor in situ at varying rates to provide a relatively continuous flow of inhibitor into the produced gas-water mixture over a long period of time.

18 Claims, No Drawings

PROCESS FOR INHIBITING HYDRATE FORMATION IN PRODUCING GAS WELLS

DESCRIPTION

1. Cross Reference to Related Application

This is a continuation-in-part of the co-pending patent application, Ser. No. 250,801, filed Apr. 3, 1981 (now abandoned).

2. Technical Field

The invention relates to a process for inhibiting the formation of gas hydrates in producing gas wells by injecting microencapsulated inhibitors into the gas-bearing formation.

3. Background Art

When gas is produced from a subterranean formation in locations of extremely cold clime solid gas hydrates can form. The hydrates form when the gas being produced via a well penetrating and communicating with the formation contacts cold temperature surfaces. Hydrates can form in the produced gas stream to such an extent that the well casing and surface lines transporting the gas become plugged. Upon plugging, gas production is terminated. Hydrate obstructions must be removed from the well casing and/or surface lines before production can resume.

One process for preventing formation of gas hydrates is to heat the produced gases during production from the subterranean formation. The gases are maintained at a temperature greater than that of the subterranean strata which surrounds the well casing from the subterranean formation to the surface. Specifically, U.S. Pat. No. 3,627,047 to Wilson et al teaches heating the gas stream before it reaches the hydrate forming temperature of the surface permafrost. Heating the gas stream is accomplished by enclosing the production string in an annular casing containing a heated fluid, preferably a liquid glycol antifreeze. The heated fluid contacts and heats the external surface of the production string which in turn heats the flowing gas by conduction. This method requires encasing the gas carrying conduit and heated fluid carrying conduit in an insulated or refrigerated casing to prevent the heated fluid within the casing from thawing the permafrost.

In a second process, a hydrate inhibitor is injected directly into the gas-bearing formation and is subsequently entrained in the gas produced from the subterranean formation. "Relationship Between Temperature of Hydrate Formation Of Natural Gases and Freezing Temperatures Of Antihydrate Inhibitors," A. G. Aliev et al, *Gazovaya Prom.*, May 1969, pages 16–18 teaches the use of glycols as gas hydrate inhibitors. A relationship is shown between the temperature of gas hydrate formation and the freezing point of the inhibitor. Inhibitors with a freezing point below water, such as glycol, effectively lower the temperature of gas hydrate formation so that hydrate plugging at the wellhead is prevented. "Prevention Of Hydrate Formation In The Well-Bore Area," V. I. Sumets, *Gazovaya Prom.*, February, 1974, pages 24–26 teaches pumping the gas hydrate inhibitor directly into the gas formation through the production well casing. The inhibitor is then withdrawn from the formation in the gas stream as produced to the surface. U.S. Pat. No. 3,676,363 to Mosier teaches the encapsulation of corrosion inhibitors. The microencapsulated corrosion inhibitors are introduced into an oil-bearing formation through a production well. The microcapsules collect within the sump where they gradually dissolve causing the corrosion inhibitor to mix with the oil-brine mixture flowing into the bottom of the well casing. The result is a continuous injection of corrosion inhibitor into the flowing liquid stream being produced to the surface.

The latter method, direct injection of hydrate inhibitor into the gas formation, is the more cost effective method for preventing formation of gas hydrates of the two processes described above. Hydrate inhibitor injection does not incur the expense of a heated fluid transport system at the wellhead as required in the first method. However, the effectiveness of the hydrate inhibitor injection method is nonetheless limited by the short residence time of the inhibitor in the gas-bearing formation. The release of hydrate inhibitor into the gas stream diminishes rapidly as a function of time. Therefore, hydrate inhibitor must be frequently reinjected into the formation to prevent hydrate formation. Each time the hydrate inhibitor is injected, production from the gas well must be interrupted. This problem of frequent interruption of production from the gas well has not yet been solved.

Where production of gas from a well having limited accessibility is plagued with the problem of hydrate formation, a spaghetti-type work string is utilized to transport a hydrate inhibitor into a subterranean gas producing formation. In an underwater completed offshore well, the work string transports the hydrate inhibitor through the underwater environment and injects the same into the formation. This small diameter work string is subjected to severe underwater forces often resulting in damage thereto.

Thus, a need exists for a process for inhibiting hydrate formation in producing gas wells wherein hydrate inhibitors can be injected directly into a gas-bearing formation with a minimum of production interruptions. A further need exists for such a process which will obviate the need for using a small diameter work string in a subsea environment.

DISCLOSURE OF INVENTION

Formation of hydrates in producing gas wells is substantially prevented by the direct introduction of a microencapsulated hydrate inhibitor suspended in a carrier fluid into the subterranean gas-bearing formation. Release of the hydrate inhibitor to the gas produced from the formation is effected by in situ degradation of the microcapsule wall and permeation of hydrate inhibitor through the microcapsule wall. The microcapsules release hydrate inhibitor into the gas at a relatively constant rate for relatively extended periods of time. A mixture of gas and hydrate inhibitor is produced from the formation via a well to the surface without substantial formation of hydrates.

BEST MODE FOR CARRYING OUT THE INVENTION

The present invention relates to a process for substantially preventing formation of gas hydrates in gas being produced from a subterranean gas-bearing formation. The process of the present invention comprises the injection of a microencapsulated gas hydrate inhibitor directly into a subterranean gas-bearing formation.

In accordance with the present invention, the microcapsules containing a gas hydrate inhibitor are suspended in a suitable hydrocarbon carrier fluid. Preferably, the hydrocarbon carrier fluid is inert to the microcapsules. However the carrier fluid may slightly solubilize the microcapsule to provide for some release of hydrate inhibitor immediately upon injection of the carrier fluid into the gas bearing formation. Exemplary hydrocarbon carriers are kerosene, diesel fuel, and other aliphatic or aromatic compounds containing less than about 15 carbon atoms in the molecule. Kerosene is the preferred carrier. The microcapsules are preferably designed to have a specific gravity substantially equal to that of the carrier fluid so as to be adequately suspended therein.

The gas hydrate inhibitor may be any conventional hydrophilic hydrate inibitor. Hydroxy containing compounds having less than about 10 carbon atoms and a freezing point below water are useful, e.g. methanol, ethanol, hydroxy ethers and glycols, the latter being preferred. Ethylene glycol and diethylene glycol are examples of preferred glycols useful with this invention. Conventional nonalcohol hydrate inhibitors, although not preferred, are ammonia and sodium or calcium chloride solutions.

Where water is present in gas being produced from a subterranean formation the problem of gas hydrate formation exists. Often gas produced from a subterranean formation is saturated with water so that formation of gas hydrates poses a very significant problem. Hydrates can form over a wide variance of temperatures up to about 25° C. Hydrates are a complex compound of hydrocarbons and water and are solid. In accordance with the present invention, once gas hydrates have formed to a degree which affects production of gas from a subterranean formation, production is temporarily terminated. A subterranean fluid having microcapsules of gas hydrate inhibitor suspended therein is injected via the production well into the subterranean gas-bearing formation wherein the microcapsules are deposited. The microcapsules utilized in the present invention are deposited. The microcapsules utilized in the present invention are formulated to have varying rates of gas hydrate inhibitor release at formation conditions. The variable rates of gas hydrate inhibitor release insure a relatively constant flow of inhibitor into gas produced over a relatively extended period of time, for example, up to about two years. The longevity of inhibitor release greatly reduces the frequency of ceasing production to inject an inhibitor.

Microcapsules suitable for use in practicing the present invention are formulated so that the encapsulating shell degrades when subjected to formation temperature and/or pressure, and/or when dissolved by formation fluids. Alternatively, the encapsulating shell is formulated of a non-degradable material, which is permeable to the encapsulated gas hydrate inhibitor, thereby releasing the inhibitors into the production gas stream. The microcapsules are formed by any conventional chemical or physical microencapsulation method, such as, interfacial polymerization or coacervation, as will be evident to the skilled artisan. U.S. Pat. No. 3,577,515 to Vandegaer teaches an interfacial polymerization process, which is a preferred method for producing microcapsules in the present invention. U.S. Pat. No. 3,577,515 is hereby incorporated by reference.

In accordance with the present invention, the microcapsules are formulated either to possess varying rates of in situ degradation or permeability to the hydrate inhibitor. Microcapsule degradation and permeability rates are dependent on three sets of parameters: the chemical composition of the microcapsule's polymer wall, the physical dimensions of the microcapsule and the microcapsule environment. Parameters relating to the chemical composition of the polymer wall are density, crystallinity, orientation, crosslinking and solubility of the polymer in the solvent core. Parameters relating to physical dimensions of the microcapsule are capsule size, wall thickness, configuration, uniformity, and number of wall coatings. Down hole environmental parameters are bottom hole temperature, bottom hole pressure, solubility of the polymer wall in the formation fluid and the partial pressure differential between the inside and outside of the capsule wall.

When formulating a microcapsule to degrade in situ, a polymer material is chosen for the microcapsule wall which is either soluble in the formation fluids, the core fluid or both. The release time of the hydrate inhibitor is dependent on the solubility rate of the microcapsule polymer wall and the microcapsule wall thickness. The release time is the time interval from when the microcapsule first enters the formation until the microcapsule wall degrades to release the core fluid.

A hydrophobic polymer wall such as polytrifluorochloroethylene degrades due to its relative solubility in the formation fluids, yet is relatively insoluble to hydrophilic microcapsule core fluids. Hydrate inhibitors such as etylene glycol or sodium chloride are hydrophilic. Conversely a hydrophilic polymer wall may be chosen which is solubilized by the hydrophilic hydrate inhibitor core fluid thereby releasing the hydrate inhibitor.

Certain polymers such as polyethylacrylate exhibit hydrophilic characteristics at relatively low molecular weight and hydrophobic properties at relatively high molecular weight. These high molecular weight polymers are preferably selected as a degradable microcapsule wall material, because they are both compatible with the interfacial polymerization process for encapsulating a hydrophilic core fluid and are relatively soluble in the formation fluids.

The microcapsule wall thickness for any given wall material is an independent parameter affecting the release time of the hydrate inhibitor. Generally the release time for the hydrate inhibitor increases with increasing wall thickness. Given the solubility rate of the wall material at the down hole temperature and pressure, microcapsules are formulated for a desired release time by setting a predetermined wall thickness value. The release rate of the hydrocarbon inhibitor to the produced gas is a function of the distribution of microcapsule release times. Microcapsules are introduced into the formation with a broad, even distribution of wall thicknesses, which corresponds to a like distribution of release times. This insures a relatively constant rate of hydrate inhibitor release for a long time duration.

Degradable microcapsules may also be formulated with a release time independent of capsule wall solubility. The microcapsules are formulated of a capsule wall material and wall thickness, such that the microcapsule wall ruptures at the down hole temperature and pressure. Generally release time decreases for a given wall material and thickness as temperature and pressure increase. Release rate is controlled as above by introducing microcapsules with a broad, even distribution of wall thicknesses.

When formulating a microcapsule permeable to the core fluid, a polymer material for the microcapsule wall is selected based on the same set of parameters as above. Generally an increase in the following parameters relating to chemical composition of the polymer wall decreases wall permeability: density, crystallinity, orientation and crosslinking. An increase in solubility of the polymer in the solvent core increases wall permeability. With respect to the physical dimensions of the capsule, an increase in capsule size or wall thickness decreases wall permeability. Spherical configuration, regularity of the surface and multiple polymer coatings also decrease the wall permeability. A decrease in the down hole environmental parameters, solubility of the wall in the formation fluid and the partial pressure differential between the inside and outside of the capsule wall, decreases wall permeability. Given the remaining fixed environmental parameters, bottom hole temperature and pressure, all of the above parameters may be varied interdependently to formulate a microcapsule with a desired permeability and corresponding release rate. A distribution of microcapsules is formulated with a broad range of permeabilities to the hydrate inhibitor core fluid. By introducing an even, broad distribution of the microcapsules into the formation the hydrate inhibitor is released at a relatively constant rate over a long time duration.

Practice of the present invention is not limited to any one of the specific mechanisms described above. In actual practice of the present invention, the release of the hydrate inhibitor from the encapsulating wall to the produced gas occurs simultaneously within the formation by both the means of permeation through the capsule walls and degradation or destruction of the capsule walls.

Even when all of the microcapsules are of the same polymer capsulating material, both mechanisms are present. The reason for this is that some core fluid permeates the degradable capsule walls before the walls totally destruct releasing the bulk of the core fluid. Conversely some non-degradable microcapsules rupture at bottom hole temperatures and pressures releasing their core fluid contents before the fluid has permeated the walls. Certain polymers such as polyethyacrylate exhibit solubility properties which are dependent on the polymer's molecular weight. Microcapsules formulated from the low molecular weight polymers are relatively insoluble in the formation fluids. Most of the core fluid released by the microcapsules results from the core fluid permeating the capsule wall. Microcapsules formulated from high molecular weight polymers are relatively soluble in the formation fluids. They release core fluids primarily by means of wall degradation.

Preferably, the carrier fluid is injected into the subterranean gas-bearing formation at a pressure greater than the overburden pressure of the formation so as to fracture the same and increase gas production therefrom. In this embodiment, propping agents are preferably suspended in the carrier fluid to prop open the fractures. When propping agents are incorporated into the carrier fluid, the microcapsules of gas hydrate inhibitor are sized substantially equal to the propping agents with a mesh size of about 20/40. The microcapsules are displaced back into the fracture and become wedged therein.

In accordance with another embodiment of the present invention, the carrier fluid having microcapsules containing a gas hydrate inhibitor suspended therein can be injected via a well having limited accessibility, i.e., an underwater or offshore completed gas well. The carrier fluid can be injected directly down the production tubing thereby obviating the need for a separate small diameter work string and the problems associated therewith.

The following example is illustrative of the application of the process of the present invention and is not to be construed as limiting the scope thereof.

EXAMPLE

Natural gas is produced from a well possessing a bottom hole temperature of about 93.3° C. and a bottom hole pressure of about $4.14 \times 10^8$ dynes per square centimeter absolute. The gas has a specific gravity of about 0.70. The maximum water vapor content of the gas at these conditions is about $3.20 \times 10^{-6}$ grams of water vapor per cubic centimeter of gas. Hydrate formation occurs when the flowing produced gas is cooled to a temperature of about 22.2° C. at a pressure of $1.18 \times 10^8$ dynes per square centimeter absolute. The maximum water vapor content of the gas at these conditions is about $2.88 \times 10^{-7}$ grams of water vapor per cubic centimeter of gas. Therefore, about $2.91 \times 10^{-6}$ grams of water vapor per cubic centimeter of gas is entrained in the gas production stream as free water droplets when hydrate formation occurs. The microcapsules containing gas hydrate inhibitor are created by adding an aqueous solution of ethylene glycol and hydroxy ethyl acrylate, a water soluble monomer, to kerosene, the dispersion medium, and mixing thoroughly to form hydrophilic colloids containing the ethylene glycol/hydroxy ethyl acrylate solution. Upon formation of the colloids, bis(diazo)isobutyronitrile, a hydrophobic polymer initiator is added to the colloidal system. A polymer shell forms at the colloid/dispersion medium interface where the initiator contacts the monomer. The ethylene glycol is encapsulated by the resulting polymer shell to produce a microcapsule. This procedure is repeated several times, each time varying the thickness and molecular weight of the polymer in the capsule shell to obtain a broad distribution of microcapsules.

The resulting distribution of microcapsules is injected into the gas-bearing formation via the production well by means of the kerosene carrier fluid throughout which the microcapsules are dispersed. The ethylene glycol is released at a relatively constant rate to the produced gas. Formation of hydrates in the produced gas are significantly inhibited. While the foregoing preferred embodiment of the invention has been described and shown, it is understood that all alternatives and modifications, such as those suggested, and others may be made thereto, and fall within the scope of the invention.

I claim:

1. A process for inhibiting the formation of gas hydrates during production of hydrocarbon-containing gas from a subterranean formation penetrated by a well in fluid communication therewith, the process comprising:
   (a) injecting into the formation via said well a carrier fluid having a plurality of microcapsules suspended therein, said microcapsules having walls encapsulating a gas hydrate inhibitor, said walls designed to be substantially non-degradable in the formation and substantially permeable to said inhibitor so as to provide a relatively constant release of said inhibitor into said gas over an extended period of time to prevent the formation of gas hydrates within said gas; and
   (b) producing a mixture of the gas and the inhibitor from said formation, said inhibitor present in the mixture at a concentration to substantially prevent the formation of gas hydrates within said mixture.

2. The process of claim 1 wherein said gas hydrate inhibitor is a glycol.

3. The process of claim 2 wherein said gas hydrate inhibitor is ethylene glycol.

4. The process of claim 1 wherein said carrier fluid is injected into said formation at a pressure greater than the overburden pressure of said formation.

5. The process of claim 4 wherein said carrier fluid has propping agents suspended therein.

6. The process of claim 5 wherein said microcapsules are sized substantially equal to said propping agents.

7. The process of claim 1 wherein said extended period of time is about two years.

8. The process of claim 1 wherein said plurality of microcapsules has a distribution of chemical and physical properties and said permeability of said wall to said hydrate inhibitor is a function of said properties.

9. The process of claim 1 wherein said well is a subsea environment.

10. A process for inhibiting the formation of gas hydrates during production of hydrocarbon-containing gas from a subterranean formation penetrated by a well in fluid communication therewith, the process comprising:

(a) injecting into the formation via said well a carrier fluid having a plurality of microcapsules suspended therein, said microcapsules having walls encapsulating a gas hydrate inhibitor, said walls predesigned to degrade within the formation at varying release times so as to provide a relatively constant release of said inhibitor into said gas over an extended period of time; and (b) producing a mixture of the gas and the inhibitor from said formation, said inhibitor present in the mixture at a concentration to substantially prevent the formation of gas hydrates within said mixture.

11. The process of claim 10 wherein said gas hydrate inhibitor is a glycol.

12. The process of claim 11 wherein said gas hydrate inhibitor is ethylene glycol.

13. The process of claim 10 wherein said carrier fluid is injected into said formation at a pressure greater than the overburden pressure of said formation.

14. The process of claim 13 wherein said carrier fluid has propping agents suspended therein.

15. The process of claim 14 wherein said microcapsules are sized substantially equal to said propping agents.

16. The process of claim 10 wherein said extended period of time is about two years.

17. The process of claim 10 wherein said plurality of microcapsules has a distribution of chemical and physical properties and said release time by said wall of said hydrate inhibitor is a function of said properties.

18. The process of claim 10 wherein said well is in a subsea environment.

* * * * *

UNITED STATES PATENT AND TRADEMARK OFFICE
CERTIFICATE OF CORRECTION

PATENT NO. : 4,456,067
DATED : June 26, 1984
INVENTOR(S) : Felton R. Pinner, Jr.

It is certified that error appears in the above–identified patent and that said Letters Patent are hereby corrected as shown below:

Col. 3, lines 38-39: Delete "The microcapsules utilized in the present invention are deposited."

Col. 4, line 27: Delete "etylene" and insert --ethylene--.

Signed and Sealed this

Twenty-seventh Day of November 1984

[SEAL]

Attest:

GERALD J. MOSSINGHOFF

Attesting Officer     Commissioner of Patents and Trademarks